Sept. 30, 1969   J. A. JAKOBSEN   3,469,523
COOKING APPARATUS

Filed May 22, 1968   2 Sheets-Sheet 1

United States Patent Office
3,469,523
Patented Sept. 30, 1969

3,469,523
COOKING APPARATUS
Johannes Andreas Jakobsen, Lysoysundet, Norway, assignor to A/S Lysosund Sildolje & Kraftforfabrik, Lysoysundet, Norway
Filed May 22, 1968, Ser. No. 731,219
Claims priority, application Norway, May 22, 1967, 168,242
Int. Cl. A47j 37/12
U.S. Cl. 99—404                9 Claims

ABSTRACT OF THE DISCLOSURE

Apparatus for continuously cooking of fat fish species in order to produce fat and oil. The apparatus comprises a cooking vessel provided with a conveyor for passing the cooking material through the vessel from an inlet opening to a discharge opening. The discharge opening is connected with a pipe being first led downwards and thereafter upwards to a point at a level several meters, for instance 5 to 10 meters above the highest point of the cooking vessel, whereby is obtained that the cooking will take place at increased pressure. Means for heating the cooking vessel may consist of a steam jacket encompassing the vessel. The apparatus may be provided with one or more oil separators.

---

The present invention relates to an apparatus for continuously cooking, especially of fat fish species as for instance herring. The invention more especially relates to a cooker comprising a cylindrical, substantially horizontal cooking vessel, provided with a rotatable screw conveyor by means of which the cooking material can be passed through the vessel in its longitudinal direction from an inlet opening at one end of the vessel to discharge opening at the other end of the vessel.

The cooking vessel is further provided with means for heating the material to be cooked. Such means can for instance consist of a steam jacket encompassing the cooking vessel, but the present invention is not limited to any special kind for heating the cooker.

In a cooker of conventional type the cooking material will be cooked at a temperature of about 100° C., and at atmospheric pressure.

The inventor has found that it is possible to obtain a more efficient production of the fat by cooking under pressure.

The invention in accordance herewith consists therein that the cooking vessel is communicating with a pipe, being first led somewhat downwards and thereafter upwards to a point at a level several meters, for instance 5 to 10 meters above the highest point of the cooking vessel.

If for instance the outlet end of the pipe is situated 10 meters above the highest point of the cooking vessel, the fish will be cooked at about one atmosphere above atmospheric pressure and at a temperature at about 120° C.

In order to avoid undesired generation of steam in the pipe, through which the cooked material passes, this pipe is according to a further feature of the invention encompassed by a cooling jacket.

Figure 1:
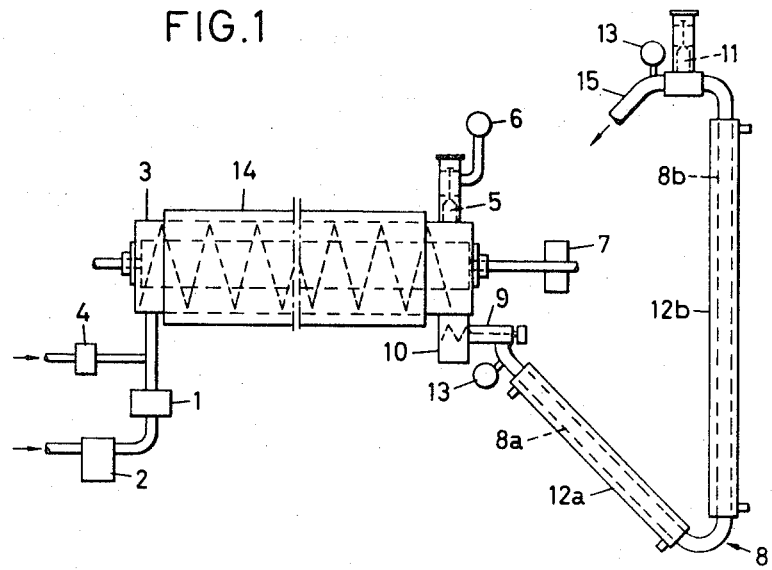
Figure 2:
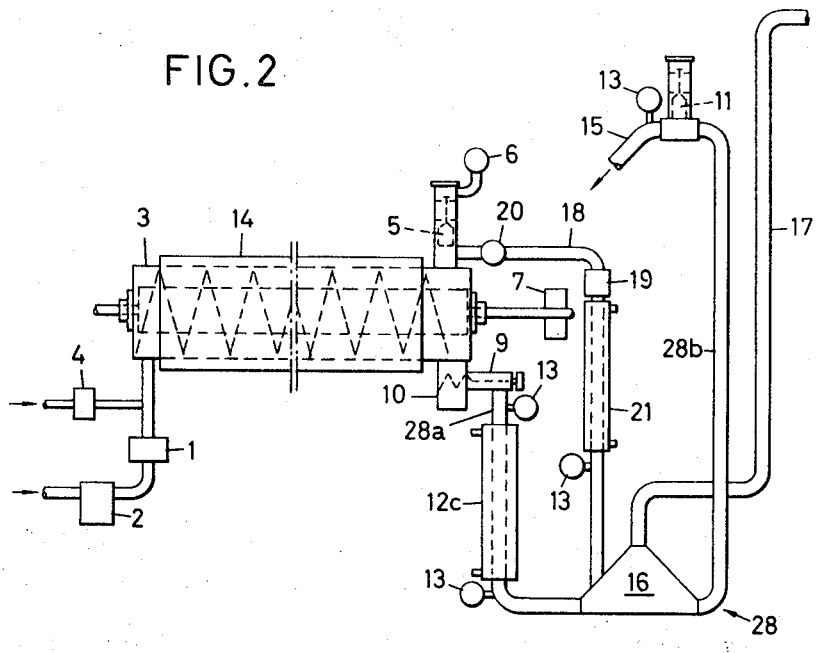
Figure 3:
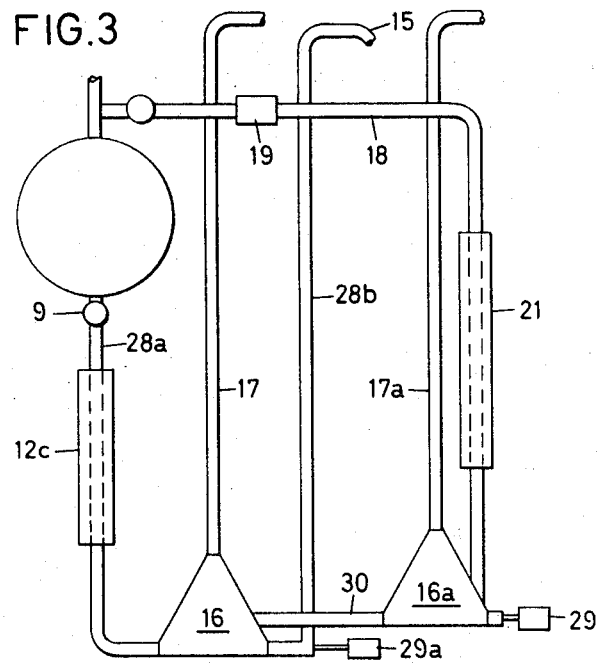
Figure 4:
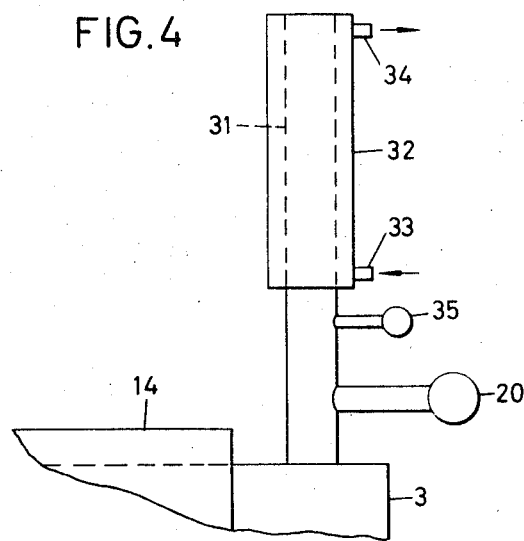

Further features of the invention will appear from the following description in connection with the drawing, in which FIG. 1 shows diagrammatically a broken longitudinal sectional view of an apparatus according to a first embodiment of the invention, FIG. 2 shows in a similar manner a second embodiment, FIG. 3 shows in a diagrammatic end view, partly broken, a third embodiment of the invention, FIG. 4 shows a detail.

In FIG. 1 numeral 1 designates a fish pump of known construction and preferably provided with variator.

2 is a trash collector.

3 is the cooking vessel proper, being cylindrical and substantially horizontally arranged.

4 is a pump with variator for pumping in cooking water.

5 is a floating valve, and 6 is a corresponding reduction valve. The floating valve is adapted to close when the cooking vessel is full of cooking material and opens when the valve casing is filled by steam. The steam will then evacuate through the reduction valve 6 which is set to pressure somewhat below the pressure which normally will appear in the cooking vessel when this is in operation.

7 is a driving means for a screw conveyor being known per se by means of which the cooking material will be fed through the vessel from left to right.

8 is the pipe arranged according to the invention, through which pipe the cooking material must pass before it discharges into the free.

The pipe 8 comprises, as will be seen, a downwards directed branch 8a, and an upwards directed branch 8b being led up to a point situated substantially higher than the highest point of the cooking vessel.

9 is a screw conveyor by means of which the cooking material is fed on to the inlet end of the pipe 8. 10 is a trash collector. 11 is a floating valve provided at the upper end of the pipe 8. 12a and 12b are two cooling jackets encompassing 8a and 8b respectively. The purpose of these cooling jackets is to cool the cooking material before it reaches up to the discharge end of the pipe. Without such cooling steam would be generated in proportion as the pressure in the cooking material decreases, which steam would have a disturbing effect on the discharging process. 13 are termometres. 14 is a steam jacket provided about the cooking vessel. 15 is the outlet for the cooking material connected with the pipe 8a.

The mode of operation of the cooker according to the embodiment described above is the following:

The raw material is pumped into the cooker 3 by means of the pump 1 is admixed with cooking water by means of the pump 4. The pump 1 is controlled by impulses from the cooker, and the pumps 1 and 4 are synchronised so that the amount of cooking water is adjusted in accordance with the amount of cooking material passed through the cooker. The material to be cooked is conveyed by means of the screw conveyor during indirect heating and is discharged into the pipe 8. The screw 9 secures that solid particles discharge together with the cooking water. The pressure in the cooker is obtained thereby that the pipe 8 is led first downwards and then upwards to a point for instance 5 to 10 meters above the highest point of the cooker.

The floating valve 5 serves as previously explained to keep the cooker filled. If steam is generated in the cooker, the steam will rise into the valve casing for the valve 5 and the latter opens for the steam so that the same can discharge through the reduction valve 6.

2 and 10 are trash collectors.

The temperature in the cooker is kept a little below the boiling point in order to avoid too much disintegration of the cooking material. By means of the cooling jackets 12, the cooking material is cooled down to a little below 100° C. so that it will not take place steam generation in the upwards directed pipe 8a.

FIG. 2 shows similarly a pure diagrammatic longitudinal section an embodiment which substantially differs from FIG. 1 therein that an oil separator is provided at the lower end of the discharge pipe for the cooking material.

Further a discharge pipe for oil collecting in the upper part of the cooking vessel is provided, and this discharge pipe is led down to the said oil separator.

Such oil separator and the said discharge pipe for oil from the upper part of the cooking vessel will not always be required, this being dependent on the fat content in the material being cooked and the degree of fat separation during the cooking.

Summer herring will for instance be adapted to disengage fat and oil already before it is being processed and with such a lenient treatment which the herring is submitted to in the cooking vessel, the raw material will here be able to disengage substantial fat and oil. If this is not removed from the cooking vessel, it may cause disorder in the process.

In FIG. 2 the numerals 1, 2, 3, 4, 5, 6, 7, 9, 10, 11, 13, 14, and 15 designate the same parts as in FIG. 1.

The discharge pipe for cooking material from the cooking vessel is in FIG. 2 designated 28. In a similar way as the pipe 8 the pipe 28 consists of a downwardly directed part 28a, and an upwardly directed part 28b being carried up to an outlet 15, being positioned in a substantial height above the highest point of the cooking vessel.

The lower part of the pipe 28a is not directly communicating with the pipe 28b, but is passed into an oil separator 16. This is so constructed that oil being separated from the cooking material may rise up to the highest point of the separator and therefrom through a discharge pipe 17 for disengaged oil up to a point in level with or above the level of the outlet 15.

The cooking material passes further through the oil separator 16 and further out through the pipe 28b.

The pipe 28b is provided with a cooling jacket 12c.

18 designates a pipe for removing of oil collecting in the upper part of the cooking vessel. Pipe 18 is led down to the oil separator 16.

19 designates a pump by means of which the necessary movement of the oil in pipe 18 can be maintained.

20 is a closing valve and 21 a cooling jacket encompassing pipe 18.

Setting aside discharge of oil through pipe 18 and separating oil in the oil separator 16, the mode of operation of the apparatus according to FIG. 2 is the same as for the apparatus according to FIG. 1 and therefor does not need any further description.

One of the advantages obtained by the embodiment according to FIG. 2 is that oil being separated in the oil separator 16 and being discharged through the pipe 17 is of higher quality with respect to colour, taste and free fatty acid than oil being pressed out of the cooking material discharged the outlet 15.

If desired the pipe 18 can be connected to a separate oil separator and oil is then obtained in three fractions.

Such an embodiment is shown in FIG. 3.

In this figure the numerals 3, 9, 12c, 15, 16, 17, 18, 19, 20, 21, 28a and 28b designates same parts as in FIG. 2. The pipe 18 is according to FIG. 3 not as in FIG. 2 connected to the oil separator 16, but to a separate oil separator 16a with oil discharge pipe 17a.

The oil separator 16a is connected with the oil separator 16 by means of a pipe 30 one end of which communicates with the lower part of oil separator 16a.

29 designates a driving means, diagrammatically indicated, for a screw conveyor (not shown) arranged near the bottom of the oil separator 16a, and is adapted to convey the bottom deposit from this separator out through the pipe 30 and into the separator 16.

Near the bottom of separator 16 a screw conveyor (not shown) is arranged, being driven by a driving means 29a, and being adapted to convey the cooking material out from the oil separator 16 and up through the discharge pipe 28b to the outlet 15.

The float valve 5 is not always necessary, and may be replaced by a cooling tube as shown in FIG. 4. In this figure 31 designates a cooling tube acting as a reflux condensor, and being at its lower, open end in open connection with the inside of the cooking vessel 13. The tube 31 is encompased by a cooling jacket 32, being supplied with a cooling medium, for instance cold water through an inlet 33, whereas 34 designates an outlet for the cooling medium.

35 is a valve for venting of air or other not condensable gases.

In FIG. 4 the numerals 3, 14 and 20 designate same parts as in FIG. 1.

Even if the apparatus in the first place is intended for production of oil from fatty fish species, it will also be usable for production of fish liver oil.

The apparatus can also be used for other cooking processes when it is desired to institute a continuous cooking under pressure.

What is claimed is:

1. In cooking apparatus of the kind described, the combination of a substantial horizontal cooking vessel having a receiving opening at one end and a discharge opening at the other end, means for heating the vessel, means for forcing material to be cooked through the vessel and out through the discharge opening, a discharge conduit having a descending part communicating at its upper end with said discharge opening, and an ascending part communicating with its lower end with the lower end of the said descending part, and provided at its upper end with an outlet for cooked material, said outlet being positioned at a level substantially higher than the highest point of the cooking vessel.

2. In cooking apparatus of the kind described, the combination as claimed in claim 1 in which the said outlet is at a level more than 5 meters above the highest point of the cooking vessel.

3. In cooking apparatus of the kind described the combination as claimed in claim 1 comprising further a cooling jacket surrounding part of the discharge conduit.

4. In a cooking apparatus of the kind described, the combination as claimed in claim 1, comprising further an outlet opening for oil at the upper part of the cooking vessel and an outlet conduit communicating with said outlet.

5. In cooking apparatus of the kind described the combination as claimed in claim 1 comprising further a steam outlet opening at the highest part of the cooking vessel and a float controlled valve adapted to prevent discharge of oil or cooking material through said steam outlet opening.

6. In cooking apparatus of the kind described, the combination as claimed in claim 1 comprising further a reflux condensor at the highest point of the cooking vessel.

7. In a cooking apparatus of the kind described the combination of a substantial horizontal vessel having a receiving opening at one end and a discharge opening at the other end, means for forcing material to be cooked through the vessel and out through the discharge opening, an oil separator positioned at a lower level than the said discharge opening, said separator having a receiving opening for cooked material discharged from said cooking vessel, a first outlet opening for oil separated from material supplied to the separator and a second outlet opening for solid material, a first conduit communicating at its one end with the said discharge opening and at its other end with said receiving opening of the said separator, a second conduit connected with its one end to the first outlet opening of the said separator and a third conduit one end of which is connected to the said second outlet opening of the separator, the other end of said third conduit being connected with an outlet opening for cooked material being positioned at a level substantially higher than the highest point of the cooking vessel.

8. In cooking apparatus of the kind described the combination as claimed in claim 7 comprising further an outlet opening for oil at the upper part of the cooking vessel, and a conduit communicating at its one end with said oil outlet opening and at its other end with the said oil separator.

9. In a cooking apparatus of the kind described, the combination as claimed in claim 7 comprising further a second oil separator having an oil outlet opening, an oil inlet opening and an outlet opening for solid material, a fourth conduit communicating at its one end with the upper part of the cooking vessel and at its other end with said oil inlet opening, a fifth conduit communicating with said oil outlet from the second oil separator and a sixth conduit one end of which is connected to the said outlet opening for solid material from the second oil separator, the other end of said sixth conduit communicating with the first oil separator.

References Cited

UNITED STATES PATENTS

| | | | |
|---|---|---|---|
| 1,922,035 | 8/1933 | Goodman | 99—405 X |
| 3,086,444 | 4/1963 | Back | 99—404 |

ROBERT W. JENKINS, Primary Examiner